US011758541B2

(12) United States Patent
Lin (10) Patent No.: US 11,758,541 B2
(45) Date of Patent: Sep. 12, 2023

(54) INFORMATION TRANSMISSION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 478 days.

(21) Appl. No.: 17/163,146

(22) Filed: Jan. 29, 2021

(65) Prior Publication Data

US 2021/0160857 A1  May 27, 2021

Related U.S. Application Data

(63) Continuation of application No. PCT/CN2018/100902, filed on Aug. 16, 2018.

(51) Int. Cl.
*H04W 74/08* (2009.01)
*H04W 72/21* (2023.01)

(52) U.S. Cl.
CPC ....... *H04W 72/21* (2023.01); *H04W 74/0808* (2013.01)

(58) Field of Classification Search
CPC .............................. H04W 72/21; H04W 74/08
See application file for complete search history.

(56) References Cited

U.S. PATENT DOCUMENTS

2016/0095114 A1\* 3/2016 Kim ................. H04W 74/0816
370/329
2016/0353475 A1  12/2016 Au et al.
(Continued)

FOREIGN PATENT DOCUMENTS

CN          103516491 A       1/2014
CN          106817769 A       6/2017
(Continued)

OTHER PUBLICATIONS

Extended European Search Report issued in corresponding European Patent Application No. 18929906.8, dated Jun. 21, 2021, 9 pages.
(Continued)

*Primary Examiner* — Michael T Vu
(74) *Attorney, Agent, or Firm* — BAYES PLLC (57) ABSTRACT

The present disclosure relates to an information transmission method, a terminal device, and a network device. The method includes determining N uplink resources used to carry N sets of uplink feedback information. The N sets of uplink feedback information is used to feed back data transmission conditions in N sets of downlink resources. The i-th set of uplink feedback information corresponding to the i-th uplink resource is used to feed back the data transmission condition in the i-th set of downlink resources, when i is greater than 1. The i-th set of downlink resources include some or all of the (i−1)-th set of downlink resources, where N is a positive integer greater than 1, and i=1, 2, 3, . . . , N. The method also includes determining M available uplink resources in the N uplink resources, where M is a positive integer less than or equal to N. The method further includes using the M available uplink resources to send, to the network device, M sets of uplink feedback information corresponding to the M available uplink resources.

19 Claims, 5 Drawing Sheets

(56) References Cited

U.S. PATENT DOCUMENTS

| | | | |
|---|---|---|---|
| 2017/0280430 A1 | 9/2017 | Yin et al. | |
| 2018/0035311 A1 | 2/2018 | Yang et al. | |
| 2018/0199333 A1 | 7/2018 | Feng et al. | |
| 2019/0069321 A1* | 2/2019 | Akkarakaran | H04L 5/0091 |
| 2019/0372727 A1* | 12/2019 | Joseph | H04L 5/0094 |

FOREIGN PATENT DOCUMENTS

| | | |
|---|---|---|
| CN | 107318086 A | 11/2017 |
| CN | 107872303 A | 4/2018 |
| CN | 108282253 A | 7/2018 |
| CN | 108292977 A | 7/2018 |
| CN | 108370564 A | 8/2018 |
| JP | 2018026703 A | 2/2018 |
| KR | 20170093059 A | 8/2017 |
| WO | 2017081799 A1 | 5/2017 |
| WO | 2017097640 A1 | 6/2017 |
| WO | 2018103020 A1 | 6/2018 |
| WO | 2018103607 A1 | 6/2018 |
| WO | 2020034167 A1 | 2/2020 |

OTHER PUBLICATIONS

"Discussion on frame structure for NR", Agenda Item: 7.1.4, Source: NTT Docomo, Inc., 3GPP TSG RAN WG1 Meeting #85 R1-165176, Nanjing, P. R. China May 23-27, 2016, 9 pages.

First Office Action issued in corresponding Indian Application No. 202117004162, dated May 13, 2022.

Second Office Action issued in corresponding Chinese Application No. 202011285617.4, dated Jul. 7, 2022.

First Office Action issued in corresponding Japanese application No. 2021-507490, dated Aug. 19, 2022.

Notice of Allowance issued in corresponding European application No. 18929906.8, dated Sep. 2, 2022.

Notice of Allowance issued in corresponding Chinese application No. 202011285617.4, dated Sep. 28, 2022.

OPPO, "HARQ enhancements for NR-U", R1-1808895, 3GPP TSG RAN WG1 Meeting #94 Gothenburg, Sweden, Aug. 20-24, 2018.

First Office action issued in corresponding European Application No. 18929906.8, dated Mar. 2, 2022, 5 pages.

First Office action issued in corresponding Chinese Application No. 202011285617.4, dated Apr. 13, 2022, 14 pages.

"3rd Generation Partnership Project; Technical Specification Group Radio Access Network; NR; Physical layer procedures for data (Release 15) The present", 3GPP TS 38.214 V15.7.0 (Sep. 2019), 105 pages.

PCT Written Opinion of the International Searching Authority issued in corresponding International Application No. PCT/CN2018/100902, dated May 15, 2019, 7 pages.

"Enhancements to Scheduling and HARQ operation for NR-U", Agenda Item: 7.6.4.3; Source: Qualcomm Incorporated; 3GPP TSG RAN WG1 Meeting #93, R1-1807391, Busan, Korea, May 21-May 25, 2018, 6 pages.

"HARQ enhancements for NR-U", Agenda Item: 7.6.4.3, Source: Ericsson, 3GPP TSG-RAN WG1 Meeting #93, Tdoc R1-1806255, Busan, Korea, May 21-25, 2018, 5 pages.

"HARQ enhancements in NR unlicensed", Agenda Item: 7.6.4.3, Source: Huawei, HiSilicon, 3GPP TSG RAN WG1 Meeting #93, R1 1805918, Busan, Korea, May 21-May 25, 2018, 5 pages.

"On HARQ-ACK multiplexing and bundling", Agenda Item: 6.1.3.3.5.2, Source: Lenovo, Motorola Mobility, 3GPP TSG RAN WG1 Meeting #90, R1-1712693, Prague, P.R. Czech Aug. 21-25, 2017, 3 pages.

* cited by examiner

Receive, through M available uplink resources, M sets of uplink feedback information corresponding to the M available uplink resources transmitted by a terminal device, the M available uplink resources being determined by the terminal device from N uplink resources, the N uplink resources being used for carrying N sets of uplink feedback information, and the N sets of uplink feedback information being used for indicating data transmission condition in N sets of downlink resources, wherein the N sets of uplink feedback information includes the M sets of uplink feedback information, an i-th set of uplink feedback information corresponding to an i-th uplink resource is used for indicating data transmission condition in an i-th set of downlink resources, the i-th set of downlink resources includes part or all of an (i-1)-th set of downlink resources ⎯ S310

FIG. 6

Terminal Device 400

Processing Unit 410

Transceiving Unit 420

INFORMATION TRANSMISSION METHOD, TERMINAL DEVICE AND NETWORK DEVICE

CROSS-REFERENCE TO RELATED APPLICATION

This application is a continuation application of International Application No. PCT/CN2018/100902, filed Aug. 16, 2018, the entire contents of which are incorporated herein by reference.

BACKGROUND

The embodiments of the present disclosure relate to the field of communications, and in particular, to an information transmission method, a terminal device, and a network device.

In the Long-Term Evolution (LTE) system, in order to ensure the reliability of uplink information, the uplink information corresponding to downlink channel/signal transmitted on grant-free spectrum is transmitted on granted spectrum.

The New Radio (NR) system needs to support independent work, so it needs to support the transmission of the uplink information corresponding to the downlink channel/signal on the grant-free spectrum.

SUMMARY

Embodiments of the present disclosure provide an information transmission method, a terminal device, and a network device, thereby increasing the reliability of data transmission.

According to a first aspect, there is provided an information transmission method, including: determining N uplink resources used for carrying N sets of uplink feedback information, the N sets of uplink feedback information being used for indicating data transmission condition in N sets of downlink resources, wherein an i-th set of uplink feedback information corresponding to an i-th uplink resource is used for indicating data transmission condition in an i-th set of downlink resources, and when i is greater than 1, the i-th set of downlink resources includes part or all of an (i−1)-th set of downlink resources, where N is a positive integer greater than 1, and i=1, 2, 3, 4, . . . , N; determining M available uplink resources from the N uplink resources, where M is a positive integer less than or equal to N; and transmitting, by using the M available uplink resources, M sets of uplink feedback information corresponding to the M available uplink resources to a network device.

According to a second aspect, there is provided an information transmission method, including: receiving, through M available uplink resources, M sets of uplink feedback information corresponding to the M available uplink resources transmitted by a terminal device, the M available uplink resources being determined by the terminal device from N uplink resources, the N uplink resources being used for carrying N sets of uplink feedback information, and the N sets of uplink feedback information being used for indicating data transmission condition in N sets of downlink resources, wherein the N sets of uplink feedback information includes the M sets of uplink feedback information, an i-th set of uplink feedback information corresponding to an i-th uplink resource is used for indicating data transmission condition in an i-th set of downlink resources, and when i is greater than 1, the i-th set of downlink resources includes part or all of an (i−1)-th set of downlink resources, where N is a positive integer greater than 1, i=1, 2, 3, 4, . . . , N, and M is a positive integer less than or equal to N.

According to a third aspect, there is provided a terminal device configured to perform the method according to the first aspect or any possible implementation manner thereof. Specifically, the terminal device includes a functional mole configured to perform the method according to the first aspect or any possible implementation manner thereof.

According to a fourth aspect, there is provided a network device configured to perform the method according to the second aspect or any possible implementation manner thereof. Specifically, the network device includes a functional mole configured to perform the method according to the second aspect or any possible implementation manner thereof.

According to a fifth aspect, there is provided a terminal device including a processor and a memory, wherein the memory is configured to store a computer program, and the processor is configured to call and run the computer program stored in the memory, thereby performing the method according to the first aspect or any possible implementation manner thereof.

According to a sixth aspect, there is provided a network device including a processor and a memory, wherein the memory is configured to store a computer program, and the processor is configured to call and run the computer program stored in the memory, thereby performing the method according to the second aspect or any possible implementation manner thereof.

According to a seventh aspect, there is provided a chip configured to perform the method according to the first or second aspect or any possible implementation manner thereof. Specifically, the chip includes a processor, configured to call and run a computer program from a memory, causing a device installed with the chip to perform the method according to the first or second aspect or any possible implementation manner thereof.

According to an eighth aspect, there is provided a computer-readable storage medium used for storing a computer program that causes a computer to perform the method according to the first or second aspect or any possible implementation manner thereof.

According to a ninth aspect, there is provided a computer program product, including computer program instructions that cause a computer to perform the method according to the first or second aspect or any possible implementation manner thereof.

According to a tenth aspect, there is provided a computer program, when being executed on a computer, caucusing the computer to perform the method according to the first or second aspect or any possible implementation manner thereof.

According to the technical solution as described above, the terminal device determines N uplink resources and transmits N sets of uplink feedback information thereon, so as to indicate data transmission condition corresponding to N sets of downlink resources through the N sets of uplink feedback information, where the i-th set of downlink resources in the N sets of downlink resources includes part or all of an (i−1)-th set of downlink resources. Then, the terminal device determines, by means of, for example, LBT detection, available uplink resources from the N uplink resources, so as to transmit corresponding uplink feedback information to the network device by using the available uplink resources, thereby increasing the probability for the terminal device to occupy channels and improving the reliability of data transmission.

DETAILED DESCRIPTION

The technical solutions in the embodiments of the present disclosure will be described below with reference to the drawings. Obviously, the described embodiments are only part of the embodiments of the present disclosure, rather than all of the embodiments. Based on the embodiments in the present disclosure, all other embodiments obtained by those of ordinary skill in the art without creative work shall fall within the protection scope of the present disclosure.

The technical solutions of the embodiments of the present disclosure can be applied to various communication systems, for example, Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, 5G system, and the like.

Figure 1:
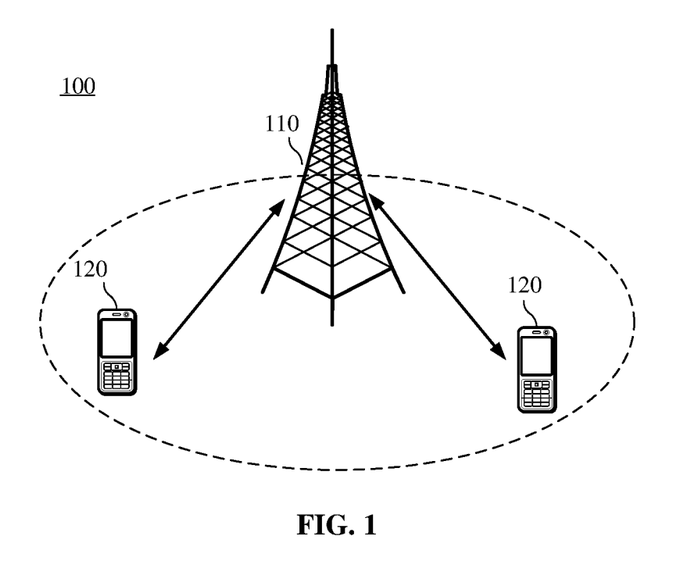
FIG. 1 is a schematic architecture diagram illustrating a communication system according to an embodiment of the present disclosure.

Exemplarily, the communication system 100 applied in the embodiments of the present disclosure is shown in FIG. 1. The communication system 100 may include a network device 110, which may be a device that communicates with a terminal device 120 (or referred to as a communication terminal or a terminal). The network device 110 may provide communication coverage for a specific geographic area and may communicate with terminal devices located within the coverage area. Optionally, the network device 110 may be a Base Transceiver Station (BTS) in the GSM or CDMA system, a NodeB (NB) in the WCDMA system, an Evolutional Node B (eNB or eNodeB) in the LTE system, or a wireless controller in the Cloud Radio Access Network (CRAN). Optionally, the network device may be a mobile switching center, a relay station, an access point, a vehicle-mounted device, a wearable device, a hub, a switch, a net bridge, a router, a network-side device in 5G network, a network device in the future evolutional Public Land Mobile Network (PLMN), or the like.

The communication system 100 may also include at least one terminal device 120 located within the coverage area of the network device 110. As used herein, the "terminal device" includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal device configured to communicate through a wireless interface may be referred to as a "wireless communication terminal", a "wireless terminal," or a "mobile terminal". Examples of the mobile terminal include but are not limited to satellite or cellular phones; Personal Communications System (PCS) terminals that can combine cellular radio phones with data processing, fax, and data communication capabilities; PDA that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

Optionally, device to device (D2D) communication may be performed between the terminal devices 120.

Optionally, the 5G system or 5G network may also be referred to as the New Radio (NR) system or NR network.

FIG. 1 exemplarily shows one network device and two terminal devices. Optionally, the communication system 100 may include multiple network devices, and the coverage of each network device may include other numbers of terminal devices. Embodiments of the present disclosure are not limited thereto.

Optionally, the communication system 100 may also include other network entities such as a network controller and a mobility management entity, which are not limited in the embodiments of the present disclosure.

It should be understood that the devices with communication functions in the network/system in the embodiments of the present disclosure may be referred to as communication devices. Taking the communication system 100 shown in FIG. 1 as an example, the communication device may include a network device 110 and a terminal device 120 with communication functions, and the network device 110 and the terminal device 120 may be the specific devices described above, which will not be repeated here. The communication device may also include other devices in the communication system 100, for example, other network entities such as a network controller and a mobility management entity, which are not limited in this embodiment of the present disclosure.

It should be understood that the terms "system" and "network" in this disclosure may be used interchangeably. The term "and/or" in this disclosure is only an association relationship describing associated objects, which means that there may be three relationships. For example, A and/or B may indicate three situations: A exists alone, both A and B exist, or B exists alone. In addition, the character "/" in this disclosure generally indicates that the associated objects before and after the same are in an "or" relationship.

On the grant-free spectrum, the communication device (e.g., the network device) needs to perform listen before talk (LBT) detection on the channels on the grant-free spectrum before transmitting signals. If the LBT succeeds, the communication device can send signals; if the LBT fails, the communication device cannot send signals. Since the transmitting device has uncertainty when transmitting signals, the receiving device needs to perform blind detection for receiving to determine whether the transmitting device successfully transmits the signal. In order to ensure fairness, in one transmission, a time length for the communication device using the grant-free spectrum channel for signal transmission cannot exceed the maximum channel occupation time (MCOT).

In the LTE system, in order to ensure the reliability of uplink information, the uplink information corresponding to downlink channel/signal transmitted on grant-free spectrum is transmitted on granted spectrum.

The NR system needs to support independent work, so it needs to support the transmission of the uplink information corresponding to the downlink channel/signal on the grant-free spectrum.

Figure 2:
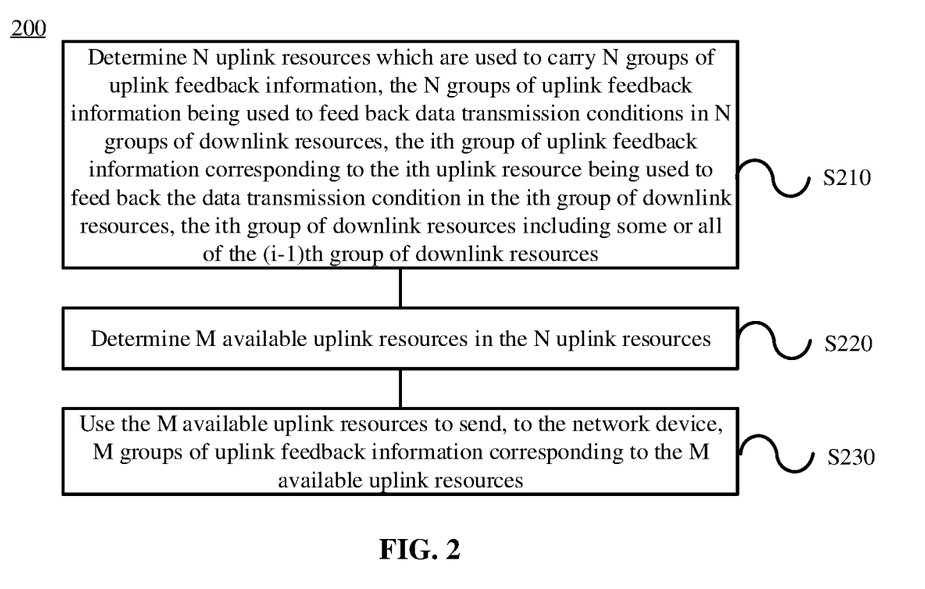
FIG. 2 is a schematic flow chart illustrating an information transmission method according to an embodiment of the present disclosure.

FIG. 2 is a schematic block diagram illustrating a method 200 for transmitting information according to an embodiment of the present disclosure. As shown in FIG. 2, the method 200 may be performed by a terminal device, such as the terminal device shown in FIG. 1. As shown in FIG. 2, the method 200 includes following steps. In step S210, N uplink resources are determined, which are used for carrying N sets of uplink feedback information, the N sets of uplink feedback information are used for indicating data transmission condition in N sets of downlink resources, wherein an i-th set of uplink feedback information corresponding to an i-th uplink resource is used for indicating data transmission condition in an i-th set of downlink resources, and when i is greater than 1, the i-th set of downlink resources includes part or all of an (i−1)-th set of downlink resources, where N is a positive integer greater than 1, and i=1, 2, 3, 4, . . . , N. In step S220, M available uplink resources are determined from the N uplink resources, where M is a positive integer less than or equal to N. In step S230, M sets of uplink feedback information corresponding to the M available uplink resources to a network device are transmitted by using the M available uplink resources.

According to an embodiment of the present disclosure, in S210, the terminal device determines N uplink resources used for carrying N sets of uplink feedback information, and there is a one-to-one correspondence between the N uplink resources and the N sets of uplink feedback information. The N sets of uplink feedback information are used for indicating data transmission condition in the N sets of downlink resources, and there is a one-to-one correspondence between the N sets of uplink feedback information and the N sets of downlink resources, that is, the i-th set of uplink feedback information corresponding to the i-th uplink resource is used for indicating the data transmission condition in the i-th set of downlink resources, where N is a positive integer greater than 1, and i=1, 2, 3, 4, . . . , N.

It should be understood that the N uplink resources in the embodiment of the present disclosure may be located on the grant-free carrier.

It should be understood that the downlink resource in the embodiment of the present disclosure is used for carrying downlink data. For example, the downlink resource can be used for carrying the physical downlink shared channel (PDSCH) and/or the physical downlink control channel (PDCCH), and its corresponding uplink feedback information may be feedback response information, that is, acknowledgement (ACK) information or non-acknowledge (NACK) information.

Specifically, the N sets of downlink resources may be arranged in chronological order, that is, the end time of the i-th set of downlink resources is earlier than the end time of the (i+1)-th set of downlink resources, and the start time of the i-th set of downlink resources is earlier than or equal to the start time of the (i+1)-th set of downlink resources.

In addition, if i takes a value greater than 1, the i-th set of downlink resources in the N sets of downlink resources includes part or all of the (i−1)-th set of downlink resources. That is, the N sets of downlink resources are divided in such a manner that two adjacent sets of downlink resources may partially overlap.

In an embodiment of the present disclosure, the N uplink resources may be located in the same channel occupation time (COT), or may be located in multiple COTs. The N sets of downlink resources may also be located in the same COT, or may be located in multiple COTs. Embodiments of the present disclosure are not limited thereto.

In an embodiment of the present disclosure, the end time of the N sets of downlink resources may be located before the start time of the N uplink resources. That is, the N sets of downlink resources and the N sets of uplink resources do not overlap at all in the time domain. Alternatively, the N sets of downlink resources and the N sets of uplink resources may also partially overlap in the time domain, and it is necessary to satisfy that the end time of the i-th set of downlink resources is before the start time of the i-th uplink resource.

Figure 3:
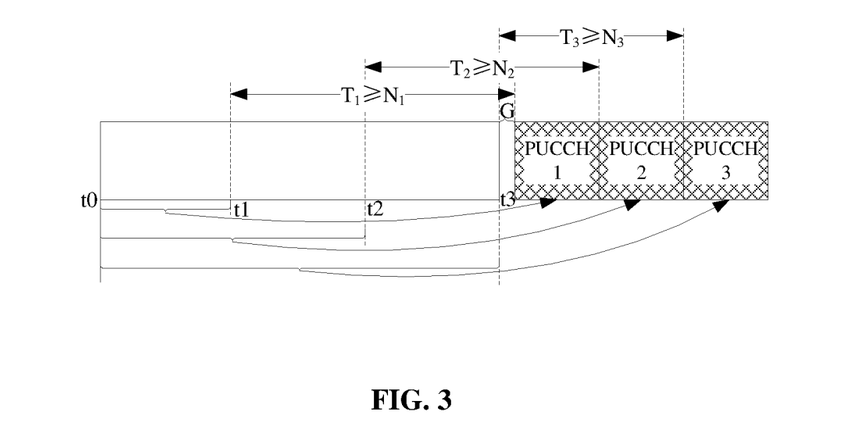
FIG. 3 is a schematic diagram illustrating the division of uplink and downlink resources according to an embodiment of the present disclosure.

The relationship between N uplink resources and N sets of downlink resources in an embodiment of the present disclosure will be described in detail below with reference to FIG. 3. FIG. 3 is a schematic diagram illustrating uplink resources and downlink resources according to an embodiment of the present disclosure. As shown in FIG. 3, three sets of downlink resources and three uplink resources corresponding to the three sets of downlink resources are taken as an example. In an embodiment, a set of downlink resources from time t0 to time t1 in FIG. 3 is the first set of downlink resources, a set of downlink resources from time t0 to time t2 is the second set of downlink resources, and a set of downlink resources from time t0 to time t3 is the third set of downlink resources. Correspondingly, PUCCH 1 is the first uplink resource corresponding to the first set of downlink resources, PUCCH2 is the second uplink resource corresponding to the second set of downlink resources, and PUCCH3 is the third uplink resource corresponding to the third set of downlink resources.

In FIG. 3, as an example for ease of understanding, the latter set of downlink resources herein include all the resources of the former set of downlink resources. For example, the second set of downlink resources includes all of the first set of downlink resources. Optionally, the latter set of downlink resources may also only include part of the resources of the former set of downlink resources. Embodiments of the present disclosure are not limited thereto.

In addition, the three uplink resources in FIG. 3 and the three sets of downlink resources do not overlap in the time domain Optionally, the uplink resources may also overlap with the downlink resources in the time domain, while the following condition may need to be met, that is, the end time of the i-th set of downlink resources is located before the start time of the i-th uplink resource. Specifically, a time difference between the end time of the i-th set of downlink resources and the start time of the i-th uplink resource is greater than or equal to a processing delay which is determined according to the time used for processing the i-th set of downlink resources.

For example, as shown in FIG. 3, taking the second set of downlink resources and the corresponding second uplink resource PUCCH 2 as an example, the end time of the second set of downlink resources is t2, and the time difference between the start time of PUCCH 2 and t2 is $T_2$, which satisfies $T_2 \geqslant N_2$, where $N_2$ represents the processing delay which is related to the time used for processing the data in the second set of downlink resources and can be determined based on the processing time used for processing the data in the second set of downlink resources.

It should be understood that the processing delay related to the i-th set of downlink resources in the embodiment of the present disclosure may be determined according to at least one of the following parameters: decoding time of PDSCH transmitted by occupying the i-th set of downlink resources, a DMRS pattern in the PDSCH, a physical channel carrying the i-th set of uplink feedback information, or PDSCH resource mapping mode. In an embodiment, the physical channel carrying the i-th set of uplink feedback information may be physical uplink shared channel (PUSCH) or physical uplink control channel (PUCCH), the DMRS pattern in the PDSCH.

In an embodiment of the present disclosure, the N uplink resources determined by the terminal device may be continuous in the time domain. Specifically, the N uplink resources are continuous in the time domain may refer to the following example. That is, the i-th uplink resource and the (i+1)-th uplink resource in the N uplink resources are absolutely continuous or relatively continuous in the time domain. In an embodiment, the absolutely continuous means that there is no time interval between the end time of the i-th uplink resource and the start time of the (i+1)-th uplink resource, while the relatively continuous means there is a time interval between the end time of the i-th uplink resource and the start time of the (i+1)-th uplink resource. The time interval may be mainly used for LBT detection and the like, rather than used for transmitting other uplink data thereon.

In the embodiment of the present disclosure, determining the N uplink resources by the terminal device may include the terminal device determines the start time and/or end time of the i-th uplink resource. Specifically, the terminal device may determine the start time and/or end time of the i-th uplink resource by using at least one of the following manner: 1, receiving first configuration information sent by the network device, the first configuration information being used for indicating the start time and/or end time of the i-th uplink resource; 2, determining the start time of the i-th uplink resource according to the end position of the N sets of downlink resources; 3, determining the start time of the i-th uplink resource according to the end position of the i-th set of downlink resources; 4, determining the start time of the i-th uplink resource according to the position of the (i−1)-th uplink resource, where i is greater than 1; 5, determining the end time of the i-th uplink resource according to the duration of the i-th uplink resource, where the duration of the i-th uplink resource is defined by a protocol or configured by the network device.

For the above-mentioned manner 1, the terminal device receives the first configuration information sent by the network device, and the first configuration information is used for indicating the start time and/or end time of the i-th uplink resource, so that the terminal device can determine the start time and/or end time of the i-th uplink resource according to the first configuration information. For example, the first configuration information may include the start time and/or end time of each uplink resource in the N uplink resources. For another example, if the length of each uplink resource is preset, for example, defined by a protocol, the first configuration information may only include the start time, and the end time of each uplink resource can be determined according to the length of each uplink resource. Embodiments of the present disclosure are not limited thereto.

For the above-mentioned manner 2, the terminal device may determine the start time of the i-th uplink resource according to the end position of the N sets of downlink resources. For example, the terminal device may determine the end time of the N sets of downlink resources and, after a predetermined time domain length subsequent to the end time of the N sets of downlink resources, determine the starting time of each uplink resource in turn according to a predetermined rule, for example, according to a preset time domain length, or according to the length of N uplink resources.

For the above-mentioned manner 3, the terminal device may also determine the start time of the i-th uplink resource according to the end position of the i-th set of downlink resources. Specifically, the terminal device may determine the start time of the i-th uplink resource located after the end position of the i-th set of downlink resources, that is, from the end time thereof. For example, the time difference between the end position of the i-th set of downlink resources and the start time of the i-th uplink resource may be related to the above-mentioned processing delay, which will not be repeated herein.

For the above-mentioned manner 4, the terminal device determines the starting time of the i-th uplink resource according to the position of the (i−1)-th uplink resource, where i is greater than 1. For example, the N uplink resources determined by the terminal device may be continuous, so the terminal device can determine the start time of the i-th uplink resource according to the end time of the (i−1)-th uplink resource with a fixed time interval therebetween. Alternatively, the terminal device determines the end time of the (i−1)-th uplink resource according to the start time of the (i−1)-th uplink resource and the duration of the (i−1)-th uplink resource, and further determines the start time of the i-th uplink resource.

For the above-mentioned manner 5, the terminal device may also determine the end time of the i-th uplink resource according to the duration of the i-th uplink resource. Specifically, the terminal device determines the start time of the i-th uplink resource and determines the end time of the i-th uplink resource according to the duration of the i-th uplink resource, where the duration of the i-th uplink resource may be defined by a protocol or may be configured by the network device.

In an embodiment of the present disclosure, the method 200 further includes: the terminal device determines a parameter of the i-th set of downlink resources corresponding to the i-th uplink resource, and the parameter of the i-th set of downlink resources includes at least one of the following parameters: the start time of the i-th set of downlink resources, the end time of the i-th set of downlink resources, and the duration of the i-th set of downlink resources.

Optionally, as an embodiment, the terminal device determining the parameter of the i-th set of downlink resources includes: the terminal device receives second configuration information sent by the network device, and the second configuration information includes at least one of the following parameters: the start time of the i-th set of downlink resources, the end time of the i-th set of downlink resources, the duration of the i-th set of downlink resources, or the length of the i-th set of uplink feedback information; determines the parameter of the i-th set of downlink resources according to the second configuration information. Specifically, the second configuration information may include some of the above parameters, and then the remaining parameters may be determined according to the some of the parameters. For example, when the second configuration information includes the length of the i-th set of uplink feedback information, the terminal device may determine the duration of the i-th set of downlink resources according to the length of the i-th set of uplink feedback information. Then, according to the duration of the i-th set of downlink resources, combined with the start time of the i-th set of downlink resources, the end time of the i-th set of downlink resources can be determined.

Optionally, as an embodiment, determining the parameter of the i-th set of downlink resources by the terminal device further includes: the terminal device determines the end time of the i-th set of downlink resources according to the start time of the i-th uplink resource. Considering that when the terminal device sends the i-th set of uplink feedback data corresponding to the i-th uplink resource, the terminal device may not have fully acquired all the data on the N sets of downlink resources. For example, it may not have processed all the data, then the terminal device may determine, according to the start time of the i-th uplink resource, the data part that has been processed corresponding to that time and determine the end time of the corresponding i-th set of downlink resources. Taking FIG. 3 as an example, according to the start time of the second uplink data PUCCH 2, at that time, the terminal device may not have completed the processing of all data received from time t0 to time t3, but only completed the processing of data received from time t0 to time t2. Accordingly, based on the start time of PUCCH 2 and the time $T_2$ for processing the data, it can be determined that the end time of the second set of downlink resources is time t2.

Optionally, as an embodiment, the terminal device determining the parameter of the i-th set of downlink resources further includes: the terminal device determines the start time of the i-th set of downlink resources according to the start time of the i-th uplink resource and the duration of the i-th set of downlink resources Alternatively, the terminal device may first determine the end time of the i-th set of downlink resources based on the start time of the i-th uplink resource; and then determine the start time of the i-th set of downlink resources in combination with the duration of the i-th set of downlink resources.

Optionally, as an embodiment, the terminal device determining the parameters of the i-th set of downlink resources further includes: the terminal device determines the start time and/or end time of the i-th set of downlink resources according to the time position of COT where the N sets of downlink data are located. Specifically, taking FIG. 3 as an example, the start time of the N sets of downlink resources may be the same, and the start time of each set of downlink resources may be determined based on the start time of the COT, for example, the start time of COT is taken as the start time of the N sets of downlink resources.

For another example, the start times of the N sets of downlink resources may also be different, but the start time of each set of downlink resources in the N sets of downlink resources can still be determined in turn based on the COT position of the N sets of downlink resources, for example, based on the start time of the COT. For example, a time interval of each set of downlink resources relative to the start time of the COT may be determined firstly, then the start time of each set of downlink resources in the N sets of downlink resources may be determined in turn according to the start time of the COT.

Similarly, the end time of each set of downlink resources in the N sets of downlink resources can also be determined in turn based on the position of the COT, for example, based on the start time or end time of the COT. Embodiments of the present disclosure are not limited thereto.

It should be understood that, in addition to the foregoing description, the following description will be given as an example to determine the start time of the i-th set of downlink resources, and the same concept may be applied to determine the end time of the i-th set of downlink resources.

Optionally, as an embodiment, the terminal device determining the start time of the i-th set of downlink resources may include determining the start time of a first COT as the start time of the i-th set of downlink resources, and the first COT is the COT where the N sets of downlink resources are located. Specifically, the N sets of downlink resources may be located in the same COT, which is referred to as the first COT. In the first COT, the start time of each set of downlink resources may be set at the start time of the first COT. As shown in FIG. 3, for example, t0 is the start time of the first COT.

Optionally, as an embodiment, the terminal device determining the start time of the i-th set of downlink resources may further include determining a time point corresponding to the sum of the start time of the first COT and a first offset as the start time of the i-th set of downlink resources, each set of downlink resources in the N sets of downlink resources corresponding to one value of the first offset. Specifically, the N sets of downlink resources may be located in the same COT, or there are multiple sets of downlink resources located in the same COT in the N sets of downlink resources. Here, the same COT is referred to as the first COT. The start time of each set of downlink resources in the multiple sets of downlink resources located in the first COT is different, and the each set of downlink resources may correspond to one value of the first offset. Taking the i-th set of downlink resources as an example, the first offset corresponding to the i-th set of downlink resources represents a time difference between the start time of the i-th set of downlink resources and the start time of the first COT. In other words, from the start time of the first COT, the time point following thereto after the first offset passes is the start time of the i-th set of downlink resources.

Figure 4:
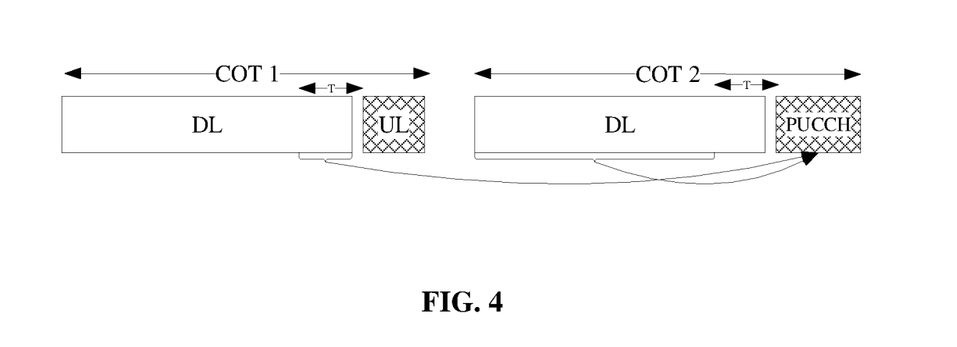
FIG. 4 is a schematic diagram illustrating the grouping of downlink resources according to an embodiment of the present disclosure.

Optionally, as an embodiment, the terminal device determining the start time of the i-th set of downlink resources may further include determining a time point corresponding to a difference between the end time of the first COT and a second offset as the start time the i-th set of downlink resources. Specifically, the N sets of downlink resources may not be located in the same COT. For example, the N sets of downlink resources belong to the first COT and at least one COT after the first COT. Accordingly, the i-th set of downlink resources in the N sets of downlink resources may be located in at least two COTs, and its start time may be located at a time point corresponding to the second offset before the end time of the first COT. Taking FIG. 4 as an example, the downlink resources corresponding to the PUCCH carried by the uplink resource in COT 2 are located in two COTs, that is, located in the corresponding parts of downlink (DL) within COT 1 and COT 2. Herein, the uplink (UL) part within COT 1 is not the N uplink resources of the terminal device, then the start time of the PUCCH is earlier than the end time of COT 1 by a time length T. In other words, the time point derived by deviating the time length T backwardly from the end time of COT 1 is the start time of the PUCCH, and T is the second offset.

Optionally, as an embodiment, the terminal device determining the start time of the i-th set of downlink resources may further include: determining a time point corresponding to the difference between the end time of the first COT and the second offset as a target time point, and determining a time point corresponding to a sum of the target time point and the first offset as the start time of the i-th set of downlink resources, each set of downlink resources in the N sets of downlink resources corresponding to one value of the first offset. Specifically, on the basis of the previous embodiment, the time point corresponding to the difference between the end time of the first COT and the second offset may be firstly determined as the target time point, and the target time point may be directly determined as the start time of the i-th set of downlink resources. Alternatively, the start time of each set of downlink resources may be determined as the target time point. Alternatively, after the target time point is determined, each set of downlink resources corresponds to one value of the first offset. For example, taking the first offset corresponding to the i-th set of downlink resources as an example, the time point corresponding to the first offset after the target time point is determined as the start time of the i-th set of downlink resources.

It should be understood that the second offset in the embodiment of the present disclosure may be determined by protocol, or configured by the network device, or determined according to the processing delay of the data corresponding to the i-th set of downlink resources. Embodiments of the present disclosure are not limited thereto.

It should be understood that the second offset in the embodiment of the present disclosure may be determined by the protocol or configured by the network device. The first offset corresponding to each set of downlink resources in the N sets of downlink resources may be the same; or, partly the same and partly different; or may also be completely different. Embodiments of the present disclosure are not limited thereto.

In S220, the terminal device determines M available uplink resources among the N uplink resources, where M is a positive integer less than or equal to N. Specifically, the terminal device has determined N uplink resources, but the N uplink resources may not be available. The terminal device may determine M available uplink resources among the N uplink resources, so that in S230, the terminal device uses the M uplink resources to send M sets of uplink feedback information corresponding to the M available uplink resources to the network device.

Figure 5:
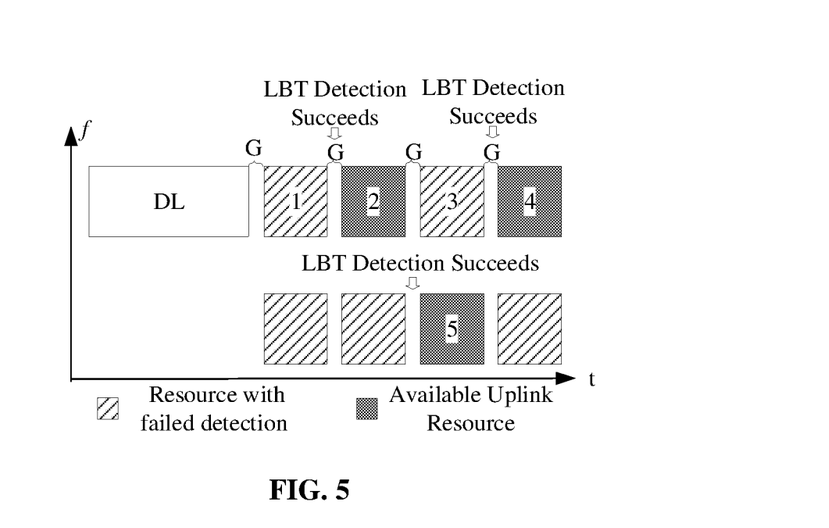
FIG. 5 is a schematic diagram illustrating the determination of available uplink resources through LBT detection according to an embodiment of the present disclosure.

Optionally, the terminal device determining the M available uplink resources among the N uplink resources may include determining the M available uplink resources among the N uplink resources through listen-before-talk (LBT) detection. For example, taking FIG. 5 as an example, the eight boxes on the right in FIG. 5 are the uplink resources determined by the terminal device. The terminal device may determine the available uplink resources from the uplink resources through LBT. For example, the shadowed boxes in FIG. 5 indicate that the uplink resource is unavailable, while the remaining three boxes indicate that the uplink resource is available through LBT detection. In an embodiment, the M sets of available uplink resources are different resources. For example, the M sets of available uplink resources may be different resources in the time domain and/or frequency domain.

Optionally, the terminal device determining M available uplink resources in the N uplink resources may include when the N uplink resources and the previous downlink resource are within the same COT, and a time difference from the previous downlink resource is less than or equal to a threshold, then it is determined that the N uplink resources are all available uplink resources, that is, N=M.

Optionally, the above two manners may be used in combination, and the terminal device determining M available uplink resources in the N uplink resources may include: when the N uplink resources include N1 first uplink resources and N2 second uplink resource, the N1 first uplink resources and the N2 second uplink resources are in different COTs. For example, the COT where the N1 first uplink resources are located is before the COT where the N2 second uplink resources are located. In an embodiment, the N1 first uplink resources and its previous downlink resources are within the same COT, and the time difference from the previous downlink resources is less than or equal to the threshold, and it is determined that the M available uplink resources include the N1 first uplink resources. In addition, for N2 second uplink resources, LBT detection is used for determining the available uplink resources, and the uplink resources passing through the LBT detection among the N2 second uplink resources are determined as available uplink resources and also belong to the M available uplink resources.

It should be understood that the above-mentioned threshold may be a preset value, which may be set according to practice or defined by a protocol. For example, it may generally be set to 16 us.

In an embodiment of the present disclosure, the determining M available uplink resources among the N uplink resources may further include when it is determined that the i-th uplink resource among the N uplink resources is available, the M uplink resources may be determined as the i-th uplink resource and all uplink resources after the i-th uplink resource.

In an embodiment of the present disclosure, when the terminal device does not receive all the resources on the N sets of downlink resources, the terminal device may not send uplink feedback information to the network device. When at least one piece of downlink data is received on the N sets of downlink resources, the terminal device may need to send uplink feedback information to the network device. When the terminal device does not receive downlink data on the i-th set of downlink resources in the N sets of downlink resources, the terminal device may determine the corresponding i-th set of uplink feedback information as NACK information, thereby avoiding other terminal devices from occupying the channel.

Therefore, according to the information transmission method provided by the embodiments of the present disclosure, the terminal device determines N uplink resources, sends N sets of uplink feedback information on the N uplink resources, and feeds back the data transmission condition of the N sets of downlink resources through the N sets of uplink feedback information. Herein, the i-th set of downlink resources in the N sets of downlink resources includes part or all of the (i−1)-th set of downlink resources, and then the available uplink resources are determined among the N uplink resources, for example, the available uplink resources are determined through LBT detection, such that the uplink resources can be used for sending corresponding uplink feedback information to the network device, thereby improving the probability of the terminal device occupying the channel and the reliability of data transmission.

Figure 6:
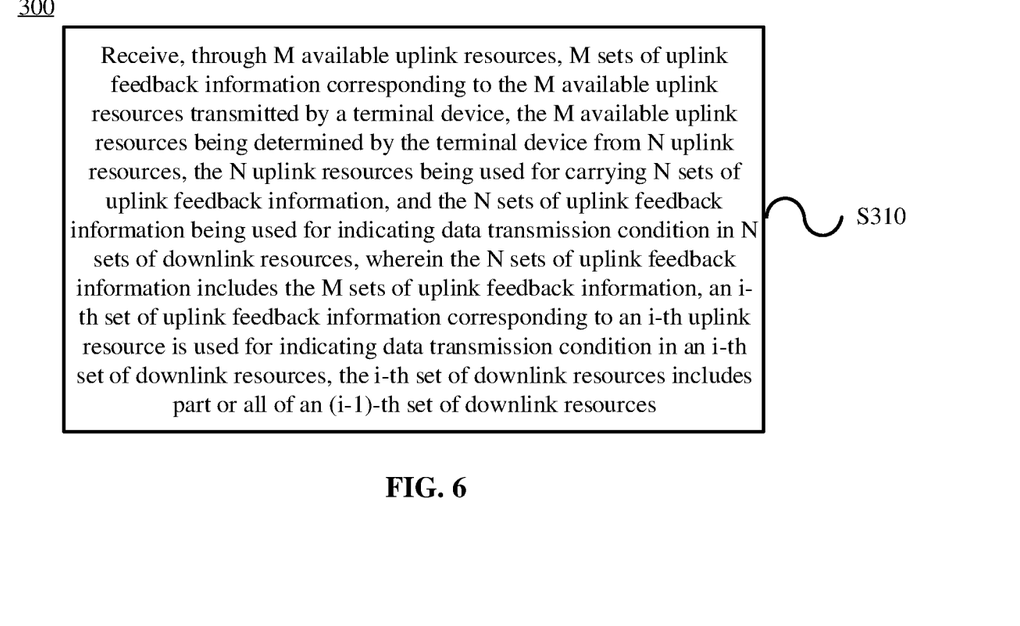
FIG. 6 is a schematic flow chart illustrating an information transmission method according to another embodiment of the present disclosure.

The foregoing describes in detail the method of transmitting information according to the embodiment of the present disclosure from the perspective of the terminal device with reference to FIGS. 1 to 5, and the following will describe the method of transmitting information according to the embodiment of the present disclosure from the perspective of the network device with reference to FIG. 6.

FIG. 6 is a schematic flowchart illustrating a method 300 for transmitting information according to an embodiment of the present disclosure. The method 300 may be performed by the network device, for example, the network device shown in FIG. 1. As shown in FIG. 2, the method 300 includes step S310: receiving, through M available uplink resources, M sets of uplink feedback information corresponding to the M available uplink resources transmitted by a terminal device, the M available uplink resources being determined by the terminal device from N uplink resources, the N uplink resources being used for carrying N sets of uplink feedback information, and the N sets of uplink feedback information being used for indicating data transmission condition in N sets of downlink resources, wherein the N sets of uplink feedback information includes the M sets of uplink feedback information, an i-th set of uplink feedback information corresponding to an i-th uplink resource is used for indicating data transmission condition in an i-th set of downlink resources, and when i is greater than 1, the i-th set of downlink resources includes part or all of an (i−1)-th set of downlink resources, where N is a positive integer greater than 1, i=1, 2, 3, 4, ..., N, and M is a positive integer less than or equal to N.

Optionally, as an embodiment, an end time of the N sets of downlink resources is before a start time of the N uplink resources; or, an end time of the i-th set of downlink resources is before a start time of the i-th uplink resource.

Optionally, as an embodiment, a time difference between the end time of the i-th set of downlink resources and the start time of the i-th uplink resource is greater than or equal to a processing delay, and the processing delay is determined by the terminal device according to time used for processing data corresponding to the i-th set of downlink resources.

Optionally, as an embodiment, the processing delay is determined according to at least one of following parameters: decoding time of physical downlink shared channel (PDSCH) transmitted by occupying the i-th set of downlink resources, a DMRS pattern in the PDSCH, or a physical channel carrying the i-th set of uplink feedback information.

Optionally, as an embodiment, the method 300 further includes determining a start time and/or an end time of the i-th uplink resource through at least one of following manners: 1. determining the start time of the i-th uplink resource according to an end position of the N sets of downlink resources; 2. determining the start time of the i-th uplink resource according to an end position of the i-th set of downlink resources; 3. determining the start time of the i-th uplink resource according to a location of the (i−1)-th uplink resource, where i is greater than 1; or 4. determining the end time of the i-th uplink resource according to a duration of the i-th uplink resource.

Optionally, as an embodiment, the method 300 further includes transmitting first configuration information to the terminal device. The first configuration information is used for indicating the start time and/or the end time of the i-th uplink resource.

Optionally, as an embodiment, the method 300 further includes: determining a parameter of the i-th set of downlink resources, the parameter of the i-th set of downlink resources including at least one of following parameters: a start time of the i-th set of downlink resources, an end time of the i-th set of downlink resources, or a duration of the i-th set of downlink resources.

Optionally, as an embodiment, the determining the parameter of the i-th set of downlink resources includes: determining the end time of the i-th set of downlink resources according to a start time of the i-th uplink resource; or, determining the start time of the i-th set of downlink resources according to the start time of the i-th uplink resource and the duration of the i-th set of downlink resources; or, determining the start time and/or the end time of the i-th set of downlink resources according to a time position of COT where N sets of downlink data are located.

Optionally, as an embodiment, the method 300 further includes: transmitting second configuration information to the terminal device, the second configuration information including at least one of following parameters: the start time of the i-th set of downlink resources, the end time of the i-th set of downlink resources, the duration of the i-th set of downlink resources, or a length of the i-th set of uplink feedback information, and determining the parameter of the i-th set of downlink resources according to the second configuration information.

Optionally, as an embodiment, the determining the start time of the i-th set of downlink resources includes: determining a start time of a first COT as the start time of the i-th set of downlink resources; or, determining a time point corresponding to a sum of the start time of the first COT and a first offset as the start time of the i-th set of downlink resources, each of the N sets of downlink resources corresponding to one value of the first offset; or, determining a time point corresponding to a difference between an end time of the first COT and a second offset as the start time of the i-th set of downlink resources, the N sets of downlink resources belonging to the first COT and at least one COT following the first COT; or, determining the time point corresponding to the difference between the end time of the first COT and the second offset as a target time point, and determining a time point corresponding to a sum of the target time point and the first offset as the start time of the i-th set of downlink resources, each of the N sets of downlink resources corresponding to one value of the first offset.

Optionally, as an embodiment, the second offset is configured by the network device or determined according to a processing delay corresponding to data of the i-th set of downlink resources.

Optionally, as an embodiment, determining the duration of the i-th set of downlink resources includes determining the duration of the i-th set of downlink resources according to the length of the i-th set of uplink feedback information.

Optionally, as an embodiment, the N uplink resources are continuous in the time domain.

Optionally, as an embodiment, when the i-th uplink resource is available, the M available uplink resource includes the i-th uplink resource and all uplink resources following the i-th uplink resource.

Optionally, as an embodiment, the N uplink resources are located on a grant-free carrier.

It should be understood that the method 300 in the embodiment of the present disclosure may correspond to the method 200, the network device in the method 300 may correspond to the network device in the method 200, and the terminal device in the method 300 may correspond to the terminal device in the method 200. In addition, the network device in the method 300 determines that the N uplink resources, the N sets of downlink resources, and the N sets of uplink feedback data correspond to those determined by the terminal device in the method 200. For example, the network device in the method 300 can determine the positions of the N uplink resources and the positions of the N sets of downlink resources in the same manner as the terminal device in the method 200, which is not repeated here.

Therefore, according to the information transmission method provided by the embodiments of the present disclosure, the terminal device determines N uplink resources, sends N sets of uplink feedback information on the N uplink resources, and feeds back the data transmission condition of the N sets of downlink resources through the N sets of uplink feedback information, so that the network device can determine the transmission condition of corresponding downlink data according to the uplink feedback information as received. Herein, the i-th set of downlink resources in the N sets of downlink resources includes part or all of the (i−1)-th set of downlink resources, and then the available uplink resources are determined among the N uplink resources, for example, the available uplink resources are determined through LBT detection, such that the uplink resources can be used for sending corresponding uplink feedback information to the network device, thereby improving the probability of the terminal device occupying the channel and the reliability of data transmission.

It should be understood that, in the various embodiments of the present disclosure, the size of the sequence number of the above-mentioned processes does not mean the order of execution, and the execution order of each process should be determined by its function and internal logic, rather than constituting any limitation on the implementation process of embodiments of the present disclosure.

In addition, the term "and/or" in this disclosure is only an association relationship describing associated objects, which means that there may be three relationships. For example, A and/or B may indicate three situations: A exists alone, both A and B exist, or B exists alone. In addition, the character "/" in this disclosure generally indicates that the associated objects before and after the same are in an "or" relationship.

The foregoing describes in detail the method of transmitting information according to the embodiments of the present disclosure with reference to FIGS. 1 to 6, and the following describes the terminal device and network device according to the embodiments of the present disclosure with reference to FIGS. 7 to 11.

Figure 7:
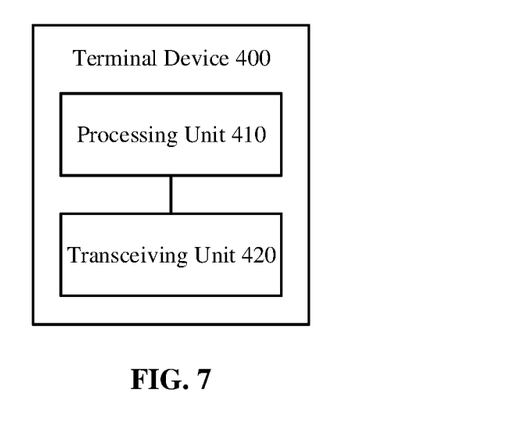
FIG. 7 is a block diagram illustrating a terminal device according to an embodiment of the present disclosure.

As shown in FIG. 7, the terminal device 400 according to an embodiment of the present disclosure includes a processing unit 410 and a transceiving unit 420. In an embodiment, the processing unit 410 is configured to determine N uplink resources used for carrying N sets of uplink feedback information, the N sets of uplink feedback information being used for indicating data transmission condition in N sets of downlink resources, wherein an i-th set of uplink feedback information corresponding to an i-th uplink resource is used for indicating data transmission condition in an i-th set of downlink resources, and when i is greater than 1, the i-th set of downlink resources includes part or all of an (i−1)-th set of downlink resources, where N is a positive integer greater than 1, and i=1, 2, 3, 4, . . . , N; the processing unit 410 is further configured to determine M available uplink resources from the N uplink resources, where M is a positive integer less than or equal to N; and the transceiving unit 420 is configured to transmit, by using the M available uplink resources, M sets of uplink feedback information corresponding to the M available uplink resources to a network device.

Optionally, as an embodiment, an end time of the N sets of downlink resources is before a start time of the N uplink resources; or, an end time of the i-th set of downlink resources is before a start time of the i-th uplink resource.

Optionally, as an embodiment, a time difference between the end time of the i-th set of downlink resources and the start time of the i-th uplink resource is greater than or equal to a processing delay, and the processing delay is determined according to time used for processing data transmitted by occupying the i-th set of downlink resources.

Optionally, as an embodiment, the processing delay is determined according to at least one of following parameters: decoding time of physical downlink shared channel (PDSCH) transmitted by occupying the i-th set of downlink resources, a DMRS pattern in the PDSCH, or a physical channel carrying the i-th set of uplink feedback information.

Optionally, as an embodiment, the processing unit 410 is further configured to: determine the M available uplink resources from the N uplink resources through listen-before-talk (LBT) detection; or, determine, when the N uplink resources are within a same channel occupation time (COT) as a previous downlink resource and a time difference between the N uplink resources and the previous downlink resource is less than or equal to a threshold, the N uplink resources as the M available uplink resources, N=M; or, when the N uplink resources include N1 first uplink resources and N2 second uplink resources, the N1 first uplink resources are within a same COT as a previous downlink resource, and a time difference between the N1 first uplink resources and the previous downlink resource is less than or equal to the threshold, determine that the M available uplink resources include the N1 first uplink resources, and include uplink resources in the N2 second uplink resources through the LBT detection.

Optionally, as an embodiment, the threshold is 16 us.

Optionally, as an embodiment, the processing unit 410 is further configured to: determine a start time and/or an end time of the i-th uplink resource through at least one of following manners: 1, receiving, through the transceiving unit 420, first configuration information sent by the network device, the first configuration information being used for indicating the start time and/or the end time of the i-th uplink resource; 2, determining the start time of the i-th uplink resource according to an end position of the N sets of downlink resources; 3, determining the start time of the i-th uplink resource according to an end position of the i-th set of downlink resources; 4, determining the start time of the i-th uplink resource according to a location of the (i−1)-th uplink resource, where i is greater than 1; or 5, determining the end time of the i-th uplink resource according to a duration of the i-th uplink resource, the duration of the i-th uplink resource being designated by a protocol or configured by the network device.

Optionally, as an embodiment, the processing unit 410 is further configured to: determine a parameter of the i-th set of downlink resources, the parameter of the i-th set of downlink resources including at least one of following parameters: a start time of the i-th set of downlink resources, an end time of the i-th set of downlink resources, or a duration of the i-th set of downlink resources.

Optionally, as an embodiment, the processing unit 410 is further configured to: receive, through the transceiving unit 420, second configuration information sent by the network device, the second configuration information including at least one of following parameters: the start time of the i-th set of downlink resources, the end time of the i-th set of downlink resources, the duration of the i-th set of downlink resources, or a length of the i-th set of uplink feedback information, and determining the parameter of the i-th set of downlink resources according to the second configuration information; or, determine the end time of the i-th set of downlink resources according to a start time of the i-th uplink resource; or, determine the start time of the i-th set of downlink resources according to the start time of the i-th uplink resource and the duration of the i-th set of downlink resources; or, determine the start time and/or the end time of the i-th set of downlink resources according to a time position of COT where N sets of downlink data are located.

Optionally, as an embodiment, the processing unit 410 is further configured to: determine a start time of a first COT as the start time of the i-th set of downlink resources; or, determine a time point corresponding to a sum of the start time of the first COT and a first offset as the start time of the i-th set of downlink resources, each of the N sets of downlink resources corresponding to one value of the first offset; or, determine a time point corresponding to a difference between an end time of the first COT and a second offset as the start time of the i-th set of downlink resources, the N sets of downlink resources belonging to the first COT and at least one COT following the first COT; or, determine the time point corresponding to the difference between the end time of the first COT and the second offset as a target time point, and determine a time point corresponding to a sum of the target time point and the first offset as the start time of the i-th set of downlink resources, each of the N sets of downlink resources corresponding to one value of the first offset.

Optionally, as an embodiment, the second offset is configured by the network device or determined according to a processing delay corresponding to data of the i-th set of downlink resources.

Optionally, as an embodiment, the second configuration information includes the length of the i-th set of uplink feedback information, and the processing unit 410 is further configured to: determine the duration of the i-th set of downlink resources according to the length of the i-th set of uplink feedback information.

Optionally, as an embodiment, the N uplink resources are continuous in time domain.

Optionally, as an embodiment, the processing unit 410 is further configured to determine, when the i-th uplink resource is determined as available, the M available uplink resources including the i-th uplink resource and all uplink resources following the i-th uplink resource.

Optionally, as an embodiment, the N uplink resources are located on a grant-free carrier.

Optionally, as an embodiment, the processing unit 410 is further configured to determine, before determining the M available uplink resources from the N uplink resources, that at least one piece of downlink data is received on the N sets of downlink resources.

Optionally, as an embodiment, the processing unit 410 is further configured to determine, when no downlink data is received on the i-th set of downlink resources, the i-th set of uplink feedback information as non-acknowledgement (NACK) information.

It should be understood that the terminal device 400 according to the embodiments of the present disclosure may correspond to the implementation of the method 200 according to the embodiments of the present disclosure, and the above and other operations and/or functions of the various units in the terminal device 400 are used for implementing the corresponding process of the terminal device in each method of FIGS. 1 to 6 respectively, which will not be repeated here for the sake of brevity.

Therefore, the terminal device provided by the embodiments of the present disclosure determines N uplink resources, sends N sets of uplink feedback information on the N uplink resources, and feeds back the data transmission condition of the N sets of downlink resources through the N sets of uplink feedback information. Herein, the i-th set of downlink resources in the N sets of downlink resources includes part or all of the (i−1)-th set of downlink resources, and then the available uplink resources are determined among the N uplink resources, for example, the available uplink resources are determined through LBT detection, such that the uplink resources can be used for sending corresponding uplink feedback information to the network device, thereby improving the probability of the terminal device occupying the channel and the reliability of data transmission.

Figure 8:
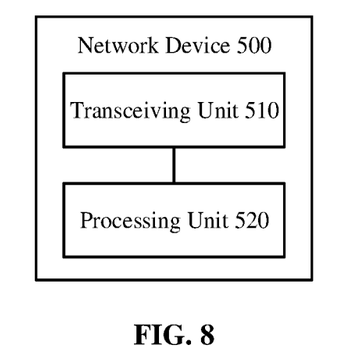
FIG. 8 is a block diagram illustrating a network device according to an embodiment of the present disclosure.

As shown in FIG. 8, the network device 500 according to an embodiment of the present disclosure includes a transceiving unit 510 and, optionally, may further include a processing unit 520. In an embodiment, the transceiving unit 510 is configured to receive, through M available uplink resources, M sets of uplink feedback information corresponding to the M available uplink resources transmitted by a terminal device, the M available uplink resources being determined by the terminal device from N uplink resources, the N uplink resources being used for carrying N sets of uplink feedback information, and the N sets of uplink feedback information being used for indicating data transmission condition in N sets of downlink resources, wherein the N sets of uplink feedback information includes the M sets of uplink feedback information, an i-th set of uplink feedback information corresponding to an i-th uplink resource is used for indicating data transmission condition in an i-th set of downlink resources, and when i is greater than 1, the i-th set of downlink resources includes part or all of an (i−1)-th set of downlink resources, where N is a positive integer greater than 1, i=1, 2, 3, 4, . . . , N, and M is a positive integer less than or equal to N.

Optionally, as an embodiment, an end time of the N sets of downlink resources is before a start time of the N uplink resources; or, an end time of the i-th set of downlink resources is before a start time of the i-th uplink resource.

Optionally, as an embodiment, a time difference between the end time of the i-th set of downlink resources and the start time of the i-th uplink resource is greater than or equal to a processing delay, and the processing delay is determined by the terminal device according to time used for processing data corresponding to the i-th set of downlink resources.

Optionally, as an embodiment, the processing delay is determined according to at least one of following parameters: decoding time of physical downlink shared channel (PDSCH) transmitted by occupying the i-th set of downlink resources, a DMRS pattern in the PDSCH, or a physical channel carrying the i-th set of uplink feedback information.

Optionally, as an embodiment, the processing unit 520 is configured to: determine a start time and/or an end time of the i-th uplink resource through at least one of following manners: 1, determining the start time of the i-th uplink resource according to an end position of the N sets of downlink resources; 2, determining the start time of the i-th uplink resource according to an end position of the i-th set of downlink resources; 3, determining the start time of the i-th uplink resource according to a location of the (i−1)-th uplink resource, where i is greater than 1; or 4, determining the end time of the i-th uplink resource according to a duration of the i-th uplink resource.

Optionally, as an embodiment, the transceiving unit 510 is further configured to: transmit first configuration information to the terminal device. The first configuration information is used for indicating the start time and/or the end time of the i-th uplink resource.

Optionally, as an embodiment, the processing unit 520 is configured to: determine a parameter of the i-th set of downlink resources, the parameter of the i-th set of downlink resources including at least one of following parameters: a start time of the i-th set of downlink resources, an end time of the i-th set of downlink resources, or a duration of the i-th set of downlink resources.

Optionally, as an embodiment, the processing unit 520 is further configured to: determine the end time of the i-th set of downlink resources according to a start time of the i-th uplink resource; or, determine the start time of the i-th set of downlink resources according to the start time of the i-th uplink resource and the duration of the i-th set of downlink resources; or, determine the start time and/or the end time of the i-th set of downlink resources according to a time position of COT where N sets of downlink data are located.

Optionally, as an embodiment, the transceiving unit 510 is further configured to: transmit second configuration information to the terminal device, the second configuration information including at least one of following parameters: the start time of the i-th set of downlink resources, the end time of the i-th set of downlink resources, the duration of the i-th set of downlink resources, or a length of the i-th set of uplink feedback information, and determine the parameter of the i-th set of downlink resources according to the second configuration information.

Optionally, as an embodiment, the processing unit 520 is further configured to: determine a start time of a first COT as the start time of the i-th set of downlink resources; or, determine a time point corresponding to a sum of the start time of the first COT and a first offset as the start time of the i-th set of downlink resources, each of the N sets of downlink resources corresponding to one value of the first offset; or, determine a time point corresponding to a difference between an end time of the first COT and a second offset as the start time of the i-th set of downlink resources, the N sets of downlink resources belonging to the first COT and at least one COT following the first COT; or, determine the time point corresponding to the difference between the end time of the first COT and the second offset as a target time point, and determine a time point corresponding to a sum of the target time point and the first offset as the start time of the i-th set of downlink resources, each of the N sets of downlink resources corresponding to one value of the first offset.

Optionally, as an embodiment, the second offset is configured by the network device or determined according to a processing delay corresponding to data of the i-th set of downlink resources.

Optionally, as an embodiment, the processing unit 520 is further configured to: determine the duration of the i-th set of downlink resources according to the length of the i-th set of uplink feedback information.

Optionally, as an embodiment, the N uplink resources are continuous in time domain.

Optionally, as an embodiment, when the i-th uplink resource is available, the M available uplink resource includes the i-th uplink resource and all uplink resources following the i-th uplink resource.

Optionally, as an embodiment, the N uplink resources are located on a grant-free carrier.

Optionally, as an embodiment, the transceiving unit 510 is further configured to: transmit, before receiving the M sets of uplink feedback information corresponding to the M available uplink resources transmitted by the terminal device, at least one piece of data on the N sets of downlink resources.

It should be understood that the network device 500 according to the embodiments of the present disclosure may correspond to the implementation of the method 300 according to the embodiments of the present disclosure, and the above and other operations and/or functions of the various units in the network device 500 are used for implementing the corresponding process of the network device in each method of FIGS. 1 to 6 respectively, which will not be repeated here for the sake of brevity.

Therefore, the network device provided by the embodiments of the present disclosure determines the transmission condition of corresponding downlink data according to the uplink feedback information as received, wherein the resource for carrying the uplink feedback information is available uplink resource determined by the terminal device from N uplink resources. The terminal device sends N sets of uplink feedback information on the N uplink resources and feeds back the data transmission condition of the N sets of downlink resources through the N sets of uplink feedback information. Herein, the i-th set of downlink resources in the N sets of downlink resources includes part or all of the (i−1)-th set of downlink resources, and then the available uplink resources are determined among the N uplink resources, for example, the available uplink resources are determined through LBT detection, such that the uplink resources can be used for sending corresponding uplink feedback information to the network device, thereby improving the probability of the terminal device occupying the channel and the reliability of data transmission.

Figure 9:
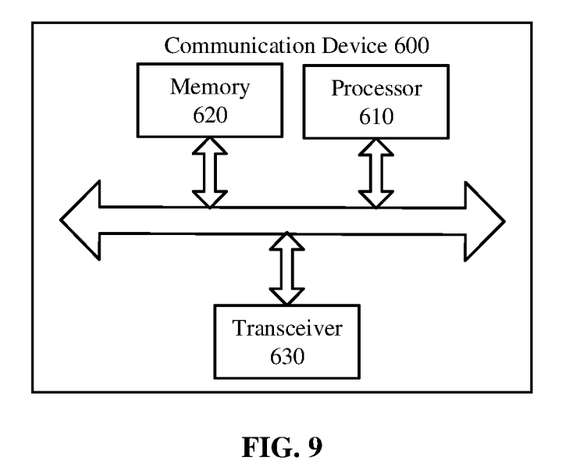
FIG. 9 is a block diagram illustrating a communication device according to an embodiment of the present disclosure.

FIG. 9 is a schematic structural diagram of a communication device 600 according to an embodiment of the present disclosure. The communication device 600 shown in FIG. 9 includes a processor 610, and the processor 610 can call and run a computer program from a memory to implement the method according to various embodiments of the present disclosure.

Optionally, as shown in FIG. 9, the communication device 600 may further include a memory 620. The processor 610 may call and run a computer program from the memory 620 to implement the method in the embodiment of the present disclosure.

The memory 620 may be a separate device independent of the processor 610 or may be integrated in the processor 610.

Optionally, as shown in FIG. 9, the communication device 600 may further include a transceiver 630, and the processor 610 may control the transceiver 630 to communicate with other devices. Specifically, it may send information or data to other devices, or receive information or data sent by the other devices.

The transceiver 630 may include a transmitter and a receiver. The transceiver 630 may further include an antenna, and the number of antennas may be one or more.

Optionally, the communication device 600 may be a network device in an embodiment of the present disclosure, and the communication device 600 may implement the corresponding process implemented by the network device in each method of the embodiment of the present disclosure, which will not be repeated here for brevity.

Optionally, the communication device 600 may be the mobile terminal/terminal device according to any embodiment of the present disclosure, and the communication device 600 may be configured to implement the corresponding processes implemented by the mobile terminal/terminal device in each method of the embodiment of the present disclosure, which will not be repeated here for brevity.

Figure 10:
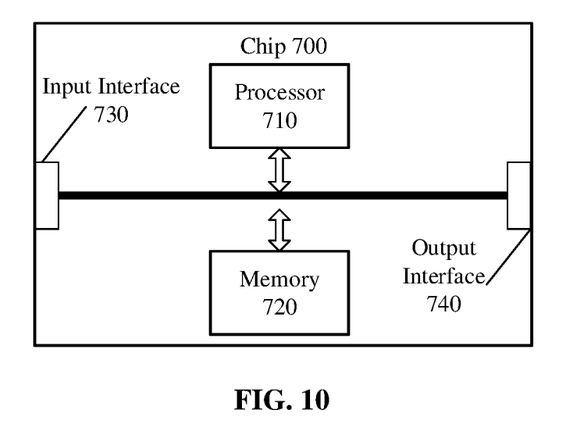
FIG. 10 is a block diagram illustrating a chip according to an embodiment of the present disclosure.

FIG. 10 is a block diagram illustrating a chip according to an embodiment of the present disclosure. The chip 700 shown in FIG. 10 includes a processor 710, and the processor 710 can call and run a computer program from the memory to implement the method according to the embodiments of the present disclosure.

Optionally, as shown in FIG. 10, the chip 700 may further include a memory 720. The processor 710 may call and run a computer program from the memory 720 to implement the method in the embodiment of the present disclosure.

In an embodiment, the memory 720 may be a separate device independent of the processor 710 or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 can control the output interface 740 to communicate with other devices or chips, and specifically, can output information or data to other devices or chips.

Optionally, the chip 700 may be applied to the network device according to any embodiment of the present disclosure, and the chip 700 may be configured to implement the corresponding processes implemented by the network device in each method of the embodiment of the present disclosure, which will not be repeated here for brevity.

Optionally, the chip 700 may be applied to the mobile terminal/terminal device according to any embodiment of the present disclosure, and the chip 700 may be configured to implement the corresponding processes implemented by the mobile terminal/terminal device in each method of the embodiment of the present disclosure, which will not be repeated here for brevity.

It should be understood that the chip mentioned in the embodiment of the present disclosure may also be referred to as a system-level chip, a system chip, a chip system, a system-on-chip, or the like.

Figure 11:
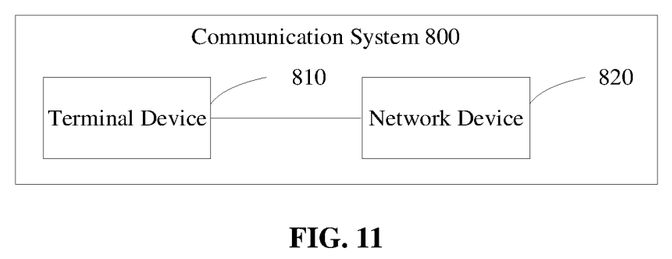
FIG. 11 is a block diagram illustrating a communication system according to an embodiment of the present disclosure.

FIG. 11 is a schematic block diagram illustrating a communication system 800 according to an embodiment of the present disclosure. As shown in FIG. 11, the communication system 800 includes a terminal device 810 and a network device 820.

In an embodiment, the terminal device 810 may be configured to implement the corresponding function implemented by the terminal device in the above method, and the network device 820 may be configured to implement the corresponding function implemented by the network device in the above method, which will not be repeated here for brevity.

It should be understood that the processor according to the embodiments of the present disclosure may be an integrated circuit chip with signal processing capability. In the implementation process, the steps of the foregoing method embodiments can be completed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present disclosure can be implemented or executed thereby. The general-purpose processor may be a microprocessor, or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module can be located in a mature storage medium such as random access memory, flash memory, read-only memory, programmable read-only memory, or electrically erasable programmable memory, registers. The storage medium may be located in the memory, and the processor reads the information in the memory and completes the steps of the above method in combination with its hardware.

It can be understood that the memory in the embodiment of the present disclosure may be a volatile memory or a non-volatile memory, or may include both volatile and non-volatile memory. In an embodiment, the non-volatile memory may be read-only memory (ROM), programmable ROM (PROM), erasable PROM (EPROM), and electrically EPROM (EEPROM) or flash memory. The volatile memory may be a random access memory (RAM), which is used as an external cache. By way of exemplary description without limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct Rambus RAM (DR RAM). It should be noted that the memories of the systems and methods described herein are intended to include, but are not limited to, these and any other suitable types of memories.

It should be understood that the foregoing memory is exemplary but not restrictive. For example, the memory in the embodiment of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM) direct Rambus RAM (DR RAM), and the like. That is to say, the memory in the embodiments of the present disclosure is intended to include but not limited to these and any other suitable types of memory.

The embodiment of the present disclosure also provides a computer-readable storage medium for storing a computer program.

Optionally, the computer-readable storage medium can be applied to the network device in the embodiments of the present disclosure, and the computer program enables the computer to execute the corresponding process implemented by the network device in the method according to each embodiment of the present disclosure, which will not be repeated for brevity.

Optionally, the computer-readable storage medium can be applied to the mobile terminal/terminal device in the embodiments of the present disclosure, and the computer program enables the computer to execute the corresponding process implemented by the mobile terminal/terminal device in the method according to each embodiment of the present disclosure, which will not be repeated for brevity.

The embodiments of the present disclosure also provide a computer program product, including computer program instructions.

Optionally, the computer program product can be applied to the network device in the embodiments of the present disclosure, and the computer program instructions cause the computer to execute the corresponding process implemented by the network device in the method according to each embodiment of the present disclosure, which will not be repeated for brevity.

Optionally, the computer program product can be applied to the mobile terminal/terminal device in the embodiments of the present disclosure, and the computer program instructions cause the computer to execute the corresponding process implemented by the mobile terminal/terminal device in the method according to each embodiment of the present disclosure, which will not be repeated for brevity.

The embodiment of the present disclosure also provides a computer program.

Optionally, the computer program can be applied to the network device in the embodiments of the present disclosure. When the computer program runs on the computer, the computer is caused to execute the corresponding process implemented by the network device in the method according to each embodiment of the present disclosure, which will not be repeated for brevity.

Optionally, the computer program can be applied to the mobile terminal/terminal device in the embodiments of the present disclosure. When the computer program runs on the computer, the computer is caused to execute the corresponding process implemented by the mobile terminal/terminal device in the method according to each embodiment of the present disclosure, which will not be repeated for brevity.

It may be understood by those skilled in the art that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Those skilled in the art can use different methods for each specific application to implement the described functions, but such implementation should not be considered beyond the scope of the present disclosure.

Those skilled in the art can clearly understand that, for the convenience and conciseness of description, the specific working process of the above-described system, device, and unit can refer to the corresponding process in the foregoing method embodiments, which will not be repeated here.

In the several embodiments provided in the present disclosure, it should be understood that the disclosed system, device, and method may be implemented in other ways. For example, the device embodiments described above are only illustrative. For example, the division of the units is only a logical function division, and there may be other divisions in actual implementation, for example, multiple units or components can be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units. That is, they may be located in one place, or they may be distributed on multiple network units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the existing technology or the part of the technical solution can be embodied in the form of a software product, and the computer software product may be stored in a storage medium, including several instructions causing a computer device (which may be a personal computer, a server, or a network device, etc.) to execute all or part of the steps of the methods described in the various embodiments of the present disclosure. The aforementioned storage media include U disk, mobile hard disk, read-only memory (ROM), random access memory (RAM), magnetic disks or optical disks, and other media that can store program codes.

The above are only specific implementations of this application, but the protection scope of this application is not limited to this. Any person skilled in the art can easily think of changes or substitutions within the technical scope disclosed in the present disclosure should be covered within the scope of protection of this application. Therefore, the protection scope of the present disclosure shall be subject to the protection scope of the claims.

What is claimed is:

1. A method for information transmission, comprising:
determining M available uplink resources from N uplink resources, wherein the N uplink resources are used for carrying N sets of uplink feedback information, an i-th set of uplink feedback information is used for indicating data transmission condition in an i-th set of downlink resources, and when i is greater than 1, the i-th set of downlink resources includes all of an (i−1)-th set of downlink resources, where N is a positive integer greater than 1, i=1, 2, 3, 4, . . . , N, and M is a positive integer less than or equal to N; and
transmitting, through the M available uplink resources, M sets of uplink feedback information corresponding to the M available uplink resources.

2. The method according to claim 1, wherein, when i is greater than 1, the i-th set of uplink feedback information includes all of an (i−1)-th set of uplink feedback information.

3. The method according to claim 1, wherein an end time of the i-th set of downlink resources is before a start time of the i-th uplink resource.

4. The method according to claim 1, wherein a time difference between an end time of the i-th set of downlink resources and a start time of the i-th uplink resource is greater than or equal to a processing delay, and the processing delay is determined according to time used for processing data transmitted by occupying the i-th set of downlink resources.

5. The method according to claim 4, wherein the processing delay is determined according to one of decoding time of physical downlink shared channel (PDSCH) transmitted by occupying the i-th set of downlink resources and a physical channel carrying the i-th set of uplink feedback information.

6. The method according to claim 1, wherein the determining M available uplink resources from the N uplink resources comprises:
    determining the M available uplink resources from the N uplink resources through listen-before-talk (LBT) detection.

7. The method according to claim 1, wherein a start time of the i-th uplink resource is determined according to an end position of the N sets of downlink resources.

8. The method according to claim 1, wherein the N uplink resources are located on a grant-free carrier.

9. The method according to claim 1, wherein, before the determining M available uplink resources from the N uplink resources, further comprises:
    determining that at least one piece of downlink data is received on the N sets of downlink resources.

10. A terminal device, comprising: a processor, a memory, and a transceiver, wherein the memory is configured to store a computer program, and the processor is configured to call and run the computer program stored in the memory;
    the processor is further configured to determine M available uplink resources from N uplink resources, wherein the N uplink resources are used for carrying N sets of uplink feedback information, an i-th set of uplink feedback information is used for indicating data transmission condition in an i-th set of downlink resources, and when i is greater than 1, the i-th set of downlink resources includes all of an (i−1)-th set of downlink resources, where N is a positive integer greater than 1, i=1, 2, 3, 4, . . . , N, and M is a positive integer less than or equal to N; and
    the transceiver is configured to transmit, through the M available uplink resources, M sets of uplink feedback information corresponding to the M available uplink resources.

11. The terminal device according to claim 10, wherein, when i is greater than 1, the i-th set of uplink feedback information includes all of an (i−1)-th set of uplink feedback information.

12. The terminal device according to claim 10, wherein an end time of the i-th set of downlink resources is before a start time of the i-th uplink resource.

13. The terminal device according to claim 10, wherein a time difference between an end time of the i-th set of downlink resources and a start time of the i-th uplink resource is greater than or equal to a processing delay, and the processing delay is determined according to time used for processing data transmitted by occupying the i-th set of downlink resources.

14. The terminal device according to claim 13, wherein the processing delay is determined according to one of decoding time of physical downlink shared channel (PDSCH) transmitted by occupying the i-th set of downlink resources and a physical channel carrying the i-th set of uplink feedback information.

15. The terminal device according to claim 10, wherein the processor is further configured to:
    determine the M available uplink resources from the N uplink resources through listen-before-talk (LBT) detection.

16. The terminal device according to claim 10, wherein a start time of the i-th uplink resource is determined according to an end position of the N sets of downlink resources.

17. The terminal device according to claim 10, wherein the N uplink resources are located on a grant-free carrier.

18. The terminal device according to claim 10, wherein the processor is further configured to:
    determine, before determining the M available uplink resources from the N uplink resources, that at least one piece of downlink data is received on the N sets of downlink resources.

19. A non-transitory computer-readable storage medium for storing a computer program that causes a computer to perform an information transmission method, wherein the method comprises:
    determining M available uplink resources from N uplink resources, wherein the N uplink resources are used for carrying N sets of uplink feedback information, an i-th set of uplink feedback information is used for indicating data transmission condition in an i-th set of downlink resources, and when i is greater than 1, the i-th set of downlink resources includes all of an (i−1)-th set of downlink resources, where N is a positive integer greater than 1, i=1, 2, 3, 4, . . . , N, and M is a positive integer less than or equal to N; and
    transmitting, through the M available uplink resources, M sets of uplink feedback information corresponding to the M available uplink resources.

\* \* \* \* \*